United States Patent
Tixier et al.

(10) Patent No.: US 10,386,180 B2
(45) Date of Patent: Aug. 20, 2019

(54) APPARATUS AND METHOD FOR MEASURING THIN MATERIAL THICKNESSES IN INVENTORY MANAGEMENT APPLICATIONS

(71) Applicant: Honeywell International Inc., Morris Plains, NJ (US)

(72) Inventors: Sebastien Tixier, North Vancouver (CA); Johan Backstrom, North Vancouver (CA); Iouri Markevitch, Vancouver (CA); Ian Baron, North Vancouver (CA)

(73) Assignee: Honeywell International Inc., Morris Plains, NJ (US)

( * ) Notice: Subject to any disclaimer, the term of this patent is extended or adjusted under 35 U.S.C. 154(b) by 443 days.

(21) Appl. No.: 15/361,639

(22) Filed: Nov. 28, 2016

(65) Prior Publication Data
US 2018/0149474 A1    May 31, 2018

(51) Int. Cl.
*G01B 21/08* (2006.01)
*G01F 22/00* (2006.01)
(Continued)

(52) U.S. Cl.
CPC ........... *G01B 21/08* (2013.01); *G01F 22/00* (2013.01); *G01F 23/284* (2013.01);
(Continued)

(58) Field of Classification Search
CPC ..................................................... G01B 21/08
(Continued)

(56) References Cited

U.S. PATENT DOCUMENTS 3,703,829 A    11/1972    Dougherty
6,972,712 B1    12/2005    Karlsson
(Continued)

FOREIGN PATENT DOCUMENTS

WO    2016011531 A1    1/2016
WO    2016053978        4/2016

OTHER PUBLICATIONS

Foreign Communication from Related Counterpart Application; PCT Patent Application No. PCT/US2017/061227; International Search Report and Written Opinion of the International Searching Authority dated Feb. 20, 2018; 9 pages.
(Continued)

*Primary Examiner* — Ricky Ngon
(74) *Attorney, Agent, or Firm* — Loza & Loza LLP; Kermit D. Lopez; Luis M. Oritz (57) ABSTRACT

An apparatus includes a transmitter configured to transmit a signal including an electromagnetic pulse towards material in a tank. The apparatus also includes a receiver configured to receive a signal including multiple reflections of the pulse. The apparatus further includes at least one processing device configured to process the received signal and determine a measurement associated with the material in the tank. To process the received signal, the at least one processing device is configured to fit multiple models onto the received signal, select one of the models, identify at least one of the multiple reflections in the received signal using the selected model, and determine the measurement using the at least one identified reflection in the received signal. Each model is constructed from a superposition of multiple types of pulse reflections.

20 Claims, 4 Drawing Sheets

(51) Int. Cl.
*G01F 23/284* (2006.01)
*G01S 13/88* (2006.01)
*G01S 7/292* (2006.01)
*G01S 7/41* (2006.01)
*G06Q 10/08* (2012.01)

(52) U.S. Cl.
CPC ............ *G01S 7/2921* (2013.01); *G01S 7/412* (2013.01); *G01S 13/88* (2013.01); *G06Q 10/087* (2013.01)

(58) Field of Classification Search
USPC ......................................................... 702/170
See application file for complete search history.

(56) References Cited

U.S. PATENT DOCUMENTS

| | | | |
|---|---|---|---|
| 8,159,386 B2 | 4/2012 | Malinovskiy et al. | |
| 9,559,417 B1* | 1/2017 | Schwarzwalder | ... H04B 7/0456 |
| 2004/0257269 A1 | 12/2004 | Laun | |
| 2005/0285777 A1 | 12/2005 | Karlsson | |
| 2009/0066966 A1 | 3/2009 | Baath | |
| 2009/0273506 A1* | 11/2009 | Delin | ................... G01F 23/284 |
| | | | 342/124 |
| 2010/0017174 A1 | 1/2010 | Lyon | |
| 2010/0070209 A1 | 3/2010 | Sai | |
| 2014/0085133 A1* | 3/2014 | Flasza | ................... G01F 23/284 |
| | | | 342/124 |
| 2014/0104098 A1 | 4/2014 | Linden et al. | |
| 2014/0210488 A1* | 7/2014 | Weber | ................... G01F 23/284 |
| | | | 324/644 |
| 2015/0168201 A1 | 6/2015 | Cobianu et al. | |
| 2015/0276458 A1 | 10/2015 | Cobianu et al. | |
| 2015/0276460 A1 | 10/2015 | Georgescu et al. | |
| 2016/0097669 A1* | 4/2016 | Backstrom | ............ G01F 23/284 |
| | | | 342/124 |
| 2016/0097670 A1 | 4/2016 | Hughes et al. | |
| 2016/0098500 A1 | 4/2016 | Haran et al. | |
| 2016/0117426 A1* | 4/2016 | Savard | ................... G06F 17/16 |
| | | | 703/2 |
| 2016/0266240 A1 | 9/2016 | Hughes et al. | |
| 2016/0305812 A1 | 10/2016 | Beselt et al. | |
| 2017/0211963 A1* | 7/2017 | Taheri | ................... G01F 23/284 |

OTHER PUBLICATIONS

International Searching Authority, "International Search Report," International Application No. PCT/US2015/052846, dated Dec. 11, 2015, 3 pages, publisher International Application Division, Korean Intellectual Property Office, Daejeon, Republic of Korea.

International Searching Authority, "Written Opinion of the International Searching Authority," International Application No. PCT/US2015/052846, dated Dec. 11, 2015, 5 pages, publisher International Application Division, Korean Intellectual Property Office, Daejeon, Republic of Korea.

* cited by examiner

APPARATUS AND METHOD FOR MEASURING THIN MATERIAL THICKNESSES IN INVENTORY MANAGEMENT APPLICATIONS

TECHNICAL FIELD

This disclosure relates generally to inventory management systems. More specifically, this disclosure relates to an apparatus and method for measuring thin material thicknesses in inventory management applications.

BACKGROUND

Processing facilities and other facilities routinely include tanks for storing liquids or other materials. For example, storage tanks are routinely used in tank farms and other storage facilities to store oil or other materials. As another example, oil tankers and other transport vessels routinely include numerous tanks storing oil or other materials. Processing facilities also often include tanks for implementing industrial processes.

Often times, it is necessary or desirable to measure the amount of material stored in a tank. This may be useful, for example, during loading of material into the tank or unloading of material from the tank. As particular examples, "custody transfers" and "weights and measures of oil" often require highly accurate measurements from a level sensor installed on a roof of a tank. In bulk storage tanks, an error of one millimeter in a reading can correspond to several cubic meters of volumetric error. This can result in losses of thousands of dollars for one or more parties.

Guided wave radar (GWR) sensors are one type of sensor commonly used in various industries to measure material levels in tanks. A GWR sensor sends electromagnetic pulses down a waveguide, and the pulses are reflected at different points including at a surface of material in a tank. The GWR sensor uses time-of-flight calculations with the pulse reflections to measure a distance to the material. GWR can also be used in multiple-material applications, such as with oil and water mixtures to measure distances to the oil surface and to the water surface underneath the oil. Other types of sensors can also be used to measure material levels in single-material or multiple-material applications.

SUMMARY

This disclosure provides an apparatus and method for measuring thin material thicknesses in inventory management applications.

In a first embodiment, an apparatus includes a transmitter configured to transmit a signal including an electromagnetic pulse towards material in a tank. The apparatus also includes a receiver configured to receive a signal including multiple reflections of the pulse. The apparatus further includes at least one processing device configured to determine a measurement associated with the material in the tank based on the received signal. To determine the measurement, the at least one processing device is configured to fit multiple models onto the received signal, select one of the models, identify at least one of the multiple reflections in the received signal using the selected model, and determine the measurement using the at least one identified reflection in the received signal. Each model is constructed from a superposition of multiple types of pulse reflections.

In a second embodiment, a method includes transmitting a signal including an electromagnetic pulse towards material in a tank. The method also includes receiving a signal including multiple reflections of the pulse. The method further includes determining a measurement associated with the material in the tank using the received signal. Determining the measurement includes fitting multiple models onto the received signal, selecting one of the models, identifying at least one of the multiple reflections in the received signal using the selected model, and determining the measurement using the at least one identified reflection in the received signal. Each model is constructed from a superposition of multiple types of pulse reflections.

In a third embodiment, a non-transitory computer readable medium contains instructions that, when executed by at least one processing device, cause the at least one processing device to obtain information associated with a received signal including multiple reflections of an electromagnetic pulse that is transmitted towards material in a tank. The medium also contains instructions that, when executed by the at least one processing device, cause the at least one processing device to determine a measurement associated with the material in the tank using the information associated with the received signal. The instructions that when executed cause the at least one processing device to determine the measurement include instructions that when executed cause the at least one processing device to fit multiple models onto the received signal, select one of the models, identify at least one of the multiple reflections in the received signal using the selected model, and determine the measurement using the at least one identified reflection in the received signal. Each model is constructed from a superposition of multiple types of pulse reflections.

In particular embodiments, each model is constructed using (i) a modeled surface reflection representing a modeled pulse reflection from a top surface of the material and (ii) a modeled interface reflection representing a modeled pulse reflection from an interface between different layers of material. In particular embodiments, each model is further constructed using (iii) a modeled second-order reflection representing a modeled pulse reflection from the interface, then from the top surface, and then from the interface again.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
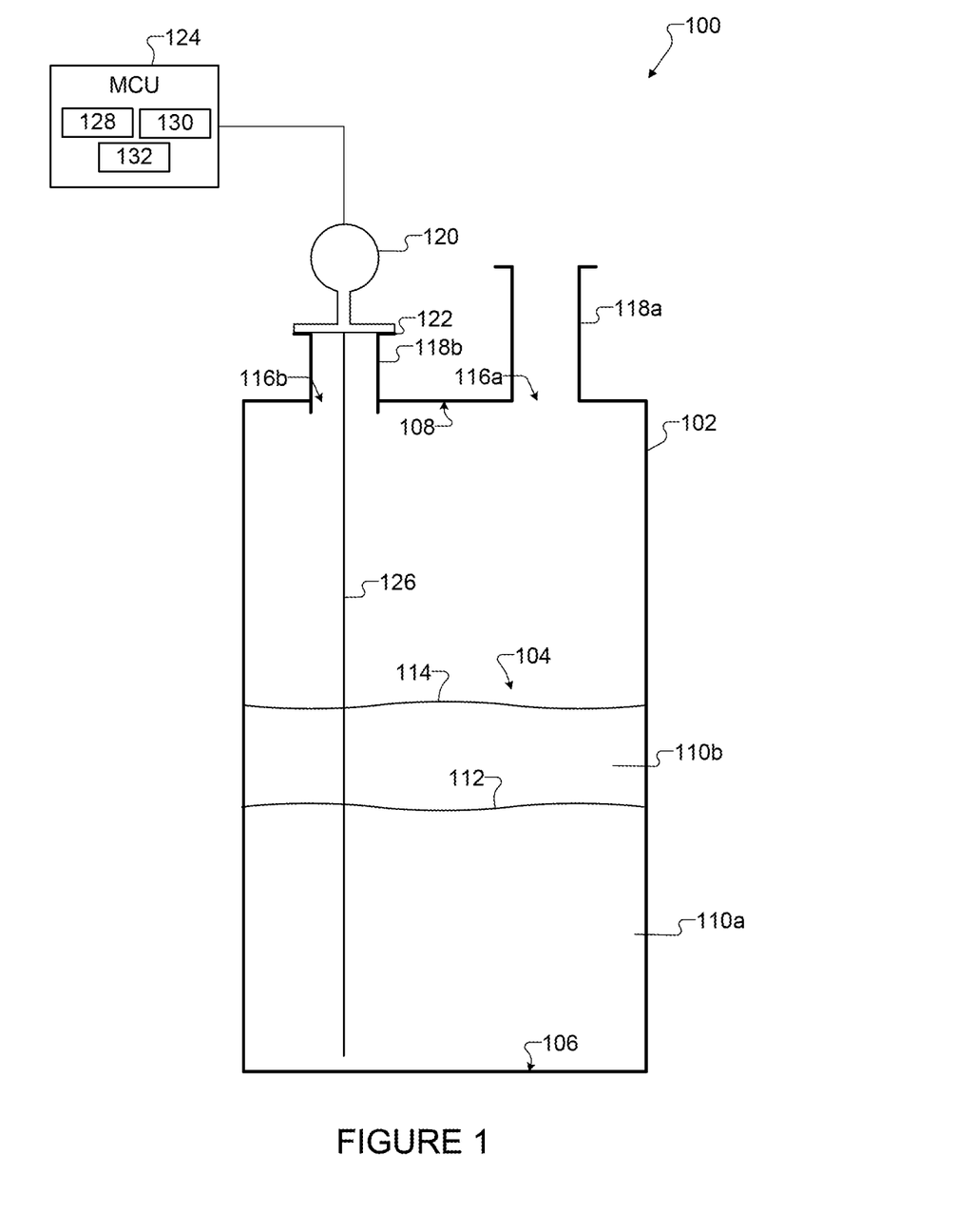
FIG. 1 illustrates an example inventory management system according to this disclosure.

FIG. 1 illustrates an example inventory management system 100 according to this disclosure. As shown in FIG. 1, the system 100 includes a tank 102, which represents any suitable structure for receiving and storing at least one material 104. The tank 102 can have any suitable shape, size, and dimensions. The tank 102 can also form part of a larger structure, such as any fixed or movable structure containing or associated with one or more tanks 102 (like a movable tanker vessel, railcar, or truck or a fixed tank farm). In this example, the tank 102 includes a floor 106 and a roof 108.

The tank 102 can be used to store any suitable materials 104, such as one or more fuels, oils, or other processed or unprocessed hydrocarbons, water, or other material(s). Also, multiple materials 104 could be stored in the tank 102. Depending on the materials 104, the materials 104 can sometimes separate or stratify to form multiple layers. In the example shown in FIG. 1, there are two layers 110a-110b of material, and an interface 112 forms where the top surface of the first layer 110a meets the bottom surface of the second layer 110b. As a particular example, the tank 102 can be used to separate oil from water, in which case the interface 112 represents where the bottom surface of the oil meets the top surface of the underlying water. Also, an air-material interface exists at a top surface 114 of the second layer 110b, and the air-material interface denotes the top of the material 104 in the tank 102.

The roof 108 of the tank 102 includes one or more openings or ports 116a-116b providing access to an interior of the tank 102, and nozzles 118a-118b could be coupled to the ports 116a-116b. In this example, the nozzle 118a is flush with the roof 108 of the tank 102, while the nozzle 118b is not flush with the roof 108 and extends some distance into the tank 102. However, the forms of the ports 116a-116b and nozzles 118a-118b shown here are examples only, and the ports 116a-116b and nozzles 118a-118b could have any other suitable configurations.

A sensor 120 is used to capture measurements associated with the material 104 in the tank 102. For example, the sensor 120 could identify a level of the material 104 in the tank 102 as defined by the top surface 114 of the material 104. As another example, the sensor 120 could identify the interface 112 between the layers 110a-110b of material 104 in the tank 102. These values can be used to identify the thickness of one or more of the layers 110a-110b of material 104 in the tank 102. In this example, the sensor 120 is mounted to a top end 122 of the nozzle 118b in order to hold the sensor 120 away from the material 104 even when the tank 102 is full. However, the sensor 120 could be mounted on or to the tank 102 in any other suitable manner.

The system 100 also includes a main control unit (MCU) 124, which controls the overall operation of the system 100. For example, the MCU 124 could receive measurements from the sensor 120, control automatic loading or unloading of material 104 into or out of the tank 102, and generate an alarm when the level of material 104 is approaching the top or bottom of the tank 102 or when a possible leak is detected in the tank 102. The MCU 124 could be remotely located from the sensor 120. In other embodiments, the system 100 does not include a separate MCU 124, and the functionality of the MCU 124 can be incorporated into the sensor 120.

The sensor 120 generally operates by transmitting radar, ultrasonic, or other electromagnetic pulses toward the material 104 and receiving reflections of the pulses from the material 104 and from the tank 102 itself. The sensor 120 analyzes the reflections to identify pulses that, for example, reflect from the top surface 114 and from the interface 112. Using those reflections, the sensor 120 can identify distances to the top surface 114 and the interface 112, which can be used to identify the level of the material 104, the location of the interface 112 in the tank 102, or the thickness(es) of the layer(s) 110a-110b. In some embodiments, a waveguide 126 can be used to direct or guide the electromagnetic pulses from the sensor 120 to the material 104. The waveguide 126 includes any suitable structure for directing signals, such as a rod, a rope, a twin rod/rope, or a coaxial probe. Although not shown, the waveguide 126 could be positioned within a stillpipe. In other embodiments, the sensor 120 could transmit the electromagnetic pulses through free space without using a waveguide.

In particular embodiments, the sensor 120 implements Time Domain Reflectometry (TDR) to obtain measurements of the level of material 104 in the tank 102 and the location of the interface 112. For example, the sensor 120 can generate and transmit pulses downward into the tank 102 and receive pulses reflected off contents within the tank 102. The pulses can reflect off the top surface 114 of the material 104, any interfaces 112 between different layers 110a-110b of material 104 in the tank 102, the floor 106 of the tank 102, and any obstacles within the tank 102 (such as agitators, ladders, and heat coils). The sensor 120 can analyze the received pulses and, using time-of-flight calculations, estimate an overall height of the material 104 in the tank 102 and possibly thicknesses of different layers of material 104 in the tank 102 based on the location of the interface(s) 112.

Measurements by the sensor 120 can be made with reference to any suitable location, often referred to as a "zero reference point." For example, the zero reference point could denote the floor 106 of the tank 102, the roof 108 of the tank 102, or the top end 122 of the nozzle 118b. Measurements could also be made relative to a known distance, such as a total distance between the roof 108 or top end 122 of the nozzle 118b and the floor 106 of the tank 102. However, measurements of any suitable form could be supported by the sensor 120.

The MCU 124 includes any suitable structure for interacting with or controlling a sensor for a tank. For example, the MCU 124 could include at least one processing device 128, at least one memory 130, and at least one interface 132. Each processing device 128 includes any suitable processing or computing device, such as a microprocessor, microcontroller, digital signal processor (DSP), field programmable gate array (FPGA), application specific integrated circuit (ASIC), or discrete logic devices. Each memory 130 includes any suitable storage and retrieval device, such as a random access memory (RAM), Flash or other read-only memory (ROM), magnetic storage device, solid-state storage device, or optical storage device. Each interface 132 includes any suitable structure facilitating communication over a connection or network, such as a wired interface (like an Ethernet interface), a wireless interface (like a radio frequency transceiver), or an electrical signal network (such as a HART or FOUNDATION FIELDBUS network).

As noted above, sensors can be used to measure material levels in tanks for single-material or multiple-material applications. When used in a multiple-material application, one layer of material can be quite thin, such as when a small amount of oil is floating above a large amount of water. In order to capture accurate measurements when the thickness of a material layer is relatively small, very narrow electromagnetic pulses often need to be used. For example, pulses of about 400 picoseconds in duration, which equals a width of about 0.12 meters in air, may be needed to measure layer thicknesses of about 10 to 20 centimeters. This is because reflections from the top and bottom surfaces of the thin layer of material can actually overlap if the pulses are too wide. If that occurs, it can be difficult or impossible to identify the different reflections and accurately calculate the total height of the material or the thickness of the thin layer of material.

Unfortunately, the use of very narrow electromagnetic pulses can lead to various problems. For example, as nozzles for the sensors become larger, multiple electromagnetic modes may propagate into the tanks from the sensors. Allowing the propagation of multiple electromagnetic modes can cause the sensors to be inaccurate and unreliable. This could limit the sizes of the nozzles used with the sensors. As a particular example, pulses with a duration of about 400 picoseconds could conventionally be used only with nozzles having a diameter of about 20 centimeters or less.

In accordance with this disclosure, the sensor 120 supports the use of multiple models, which are used to mathematically represent different types of signal reflections in a tank 102. For example, the models could mathematically represent combinations of different surface and interface reflections that can occur at different locations within the tank 102. Surface reflections denote reflections from the top surface 114 of material 104 in a tank. Interface reflections denote reflections from an interface 112 between different layers 110a-110b of material 104 in a tank.

Various models can be fit onto the actual signals reflected from the material 104 and received by the sensor 120. The best model(s) that most closely match(es) the actual reflected signals can be selected and used to identify the top surface and interface reflections. Once the top surface and interface reflections are accurately identified, the sensor 120 can use those reflections to identify locations of the top surface 114 and the interface 112 in the tank 102. Note that the fitting of models onto received signals may only be needed in certain circumstances, such as when the thickness of a layer of material falls below a threshold distance like 15 or 20 centimeters.

In some embodiments, each model that is overlaid onto the actual signals received by the sensor 120 denotes a combination or sum of a surface reflection, an interface reflection, and optionally a second-order reflection. Each modeled surface reflection denotes a signal that is reflected from the top surface 114 of material 104 in a tank. Each modeled interface reflection denotes a signal that is reflected from an interface 112 between different layers 110a-110b of material 104 in a tank. Each modeled second-order reflection denotes a signal that is reflected from an interface 112, then from the top surface 114, and then from the interface 112 again. Different models can include different modeled surface, interface, and second-order reflections, such as different surface and interface reflections at different heights within a tank and different second-order reflections associated with different thicknesses of the upper layer of material in the tank.

By fitting different models onto actual received signals and selecting the model that is closest to the actual received signals, the sensor 120 can more accurately identify the reflections from both the top surface 114 of material 104 in a tank 102 and an interface 112 between different layers 110a-110b of material 104 in the tank 102. As a result, the sensor 120 can measure very thin layers of material in the tank 102. In particular embodiments, the sensor 120 could measure a material layer thickness of as little as about five centimeters or even less using a nozzle of eight inches (about 20 centimeters) or more in diameter.

Among other things, the proposed approach can provide improved accuracy and performance compared to conventional correlation and peak searching algorithms, particularly when the upper layer 110b of material in the tank 102 is very thin. As a result, the proposed approach can more accurately measure interface positions or layer thicknesses in the tank 102. Moreover, the proposed approach can account for second-order reflections in which pulses are reflected from the interface 112, then from the top surface 114, and then from the interface 112 again before reaching the sensor 120. The lack of consideration of second-order reflections in conventional correlation and peak searching algorithms can result in sizable errors in measurements when the thickness of the upper layer is relatively small, such as about 10 to 12 centimeters or less.

Additional details regarding this sensing functionality are provided below. While the details below may be described with respect to the sensor 120 operating in the system 100 of FIG. 1, the details below could also be used in any other suitable sensors, and those sensors could be used in any other suitable systems.

Although FIG. 1 illustrates one example of an inventory management system 100, various changes may be made to FIG. 1. For example, the functional division shown in FIG. 1 is for illustration only. Various components in FIG. 1 could be combined, further subdivided, rearranged, or omitted or additional components could be added according to particular needs. Also, while various functions may be attributed to specific components in the system 100, other systems could implement those functions in different ways. For instance, the use of models to locate specific reflections in received signals could occur within the MCU 124 rather than the sensor 120. In addition, while the tank 102 is shown here as including only two layers 110a-110b of material 104 and a single interface 112, the tank 102 could include any number of layers and any number of material interfaces. With appropriate models, the sensor 120 could use the same approaches described in this patent document with more than two layers of material.

Figure 2:
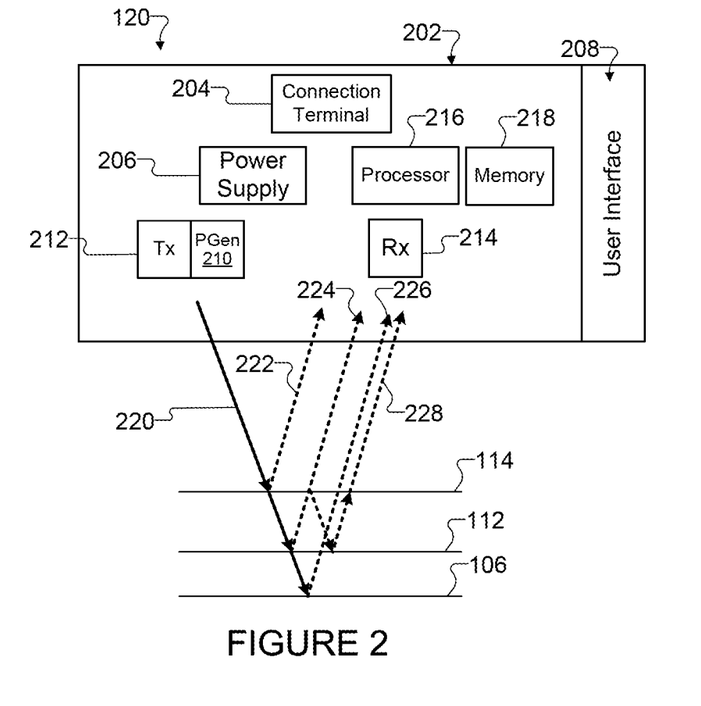
FIGS. 2 through 4 illustrate an example sensor for measuring thin material thicknesses in inventory management applications according to this disclosure.
Figure 3:
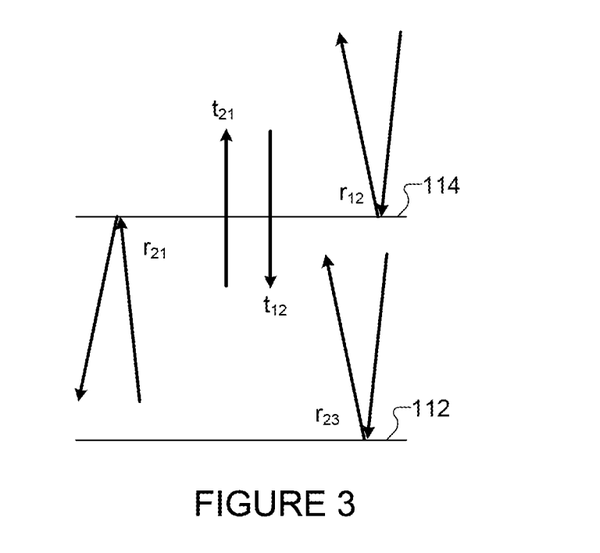
Figure 4:
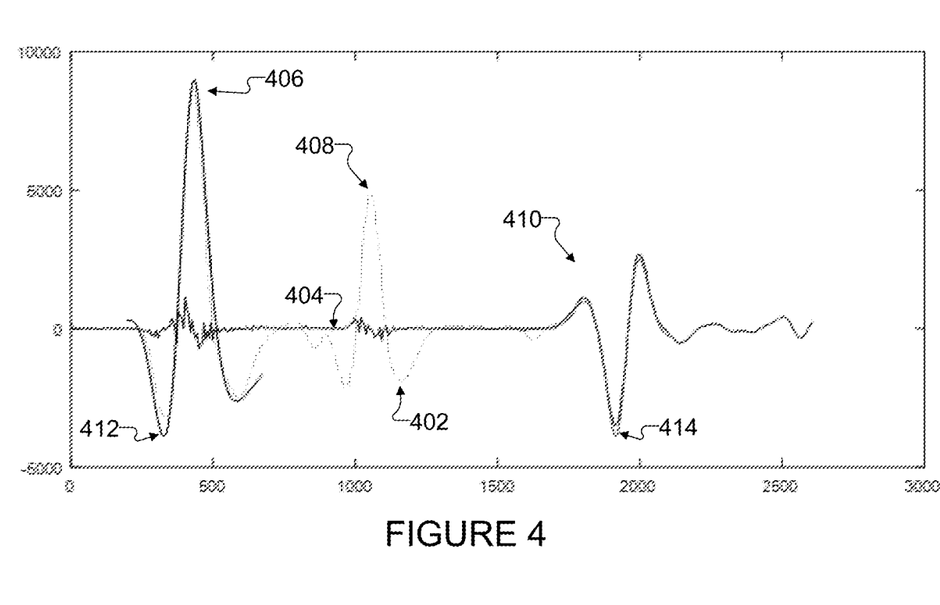

FIGS. 2 through 4 illustrate an example sensor 120 for measuring thin material thicknesses in inventory management applications according to this disclosure. For ease of explanation, the sensor 120 is described as being used in the system 100 of FIG. 1. However, the sensor 120 could be used in any other suitable system.

As shown in FIG. 2, the sensor 120 includes a housing 202, which encases, protects, or otherwise includes various components of the sensor 120. The housing 202 could be formed from any suitable material(s) and in any suitable matter. The housing 202 could also have any suitable size, shape, and dimensions. In some embodiments, at least part of the housing 202 could be sized and shaped to fit within and couple to a nozzle of the tank 102.

The sensor 120 also includes a connection terminal 204 and a power supply 206. The connection terminal 204 allows the sensor 120 to be coupled to an external device, system, or network, such as to the MCU 124. In some embodiments, the connection terminal 204 could allow the sensor 120 to be coupled to a 4-20 mA industrial control current loop, although any other suitable connection could also be supported. However, note that the connection terminal 204 could be replaced or supplemented with a wireless radio that supports wireless communications. The power supply 206 denotes any suitable source of operating power for the sensor 120, such as at least one battery, capacitor, fuel cell, or solar cell. The power supply 206 could store any suitable amount of power for short or prolonged operation of the sensor 120. In some embodiments, the sensor 120 could be powered over a current loop or other link, and the power supply 206 may only be used to store a small amount of power for the sensor 120. In other embodiments, the sensor 120 could be powered primarily or exclusively by the power supply 206, and the power supply 206 could store a much larger amount of power.

The sensor 120 further includes a local user interface 208, which could be used to interact with local users near the sensor 120. For example, the user interface 208 could include a screen or other display for presenting measurements and sensor settings to a user. The user interface 208 could also include buttons (hard or soft) or other input mechanisms for receiving user input, such as input to start or stop sensing or input to change a setting of the sensor 120. The user interface 208 could further support a short-range wireless connection (such as a BLUETOOTH connection) allowing interaction with nearby users via their wireless devices. The user interface 208 denotes any suitable structure(s) facilitating input or output interactions with a user.

In addition, the sensor 120 includes various electronic components used to generate, receive, and process electromagnetic signals. For example, the sensor 120 includes a pulse generator 210 and at least one transmitter 212. The pulse generator 210 generates electromagnetic pulses that are transmitted by the transmitter 212 into a tank 102. Various reflected pulses are received by at least one receiver 214, which can pass the reflected pulses (possibly after digitization) to at least one processing device 216 for analysis. The pulses could be transmitted in any suitable manner, such as through a waveguide 126 or through free space.

The pulse generator 210 includes any suitable structure for generating at least one signal containing pulses. The pulse generator 210 could be adjustable so that pulses of different durations can be generated. In some embodiments, the pulse generator 210 can generate pulses with a minimum duration of about 400 picoseconds or even less, which can help the sensor 120 identify very small thicknesses for layers of material in a tank. The transmitter 212 and the receiver 214 denote any suitable structure(s) for transmitting and receiving signals, respectively. Note that while shown as separate components, the transmitter 212 and the receiver 214 could denote portions of a common transceiver.

The processing device 216 analyzes information about reflected signals in order to (among other things) identify reflections from the top surface of material 104 in the tank 102 and from an interface 112 between different layers 110a-110b of material 104 in the tank 102. The reflections can then be used by the processing device 216 to identify the level of the material 104 and the location of the interface 112, such as by using time-of-flight or TDR calculations. As noted above and as described in more detail below, the processing device 216 could obtain models (such as those stored in at least one memory 218 or calculated by the processing device 216) and could fit various models onto the actual reflected signals in order to select the best model(s). The selected model(s) can then be used to identify the top surface and interface reflections.

Each processing device 216 includes any suitable processing or computing device, such as a microprocessor, microcontroller, DSP, FPGA, ASIC, or discrete logic devices. Each memory 218 includes any suitable storage and retrieval device, such as a RAM, Flash or other ROM, magnetic storage device, solid-state storage device, or optical storage device. Note, however, that the sensor 120 itself need not analyze information in order to determine measurements. As noted above, the MCU 124 could perform these functions, in which case the processing device 216 could pass certain data (such as data defining received signals) to the MCU 124 and need not analyze the data using any models.

As shown in FIG. 2, pulses 220 that are transmitted by the transmitter 212 can be reflected in various ways by the material 104 in the tank 102. For example, a portion of a signal containing the pulses 220 is reflected at the top surface 114 of the material 104 in the tank 102, returning to the receiver 214 as pulses 222. Another portion of the signal containing the pulses 220 is reflected at the interface 112 between different layers 110a-110b of material 104 in the tank 102, returning to the receiver 214 as pulses 224. Yet another portion of the signal containing the pulses 220 can be reflected off the end of the waveguide 126 or some portion of the tank 102, returning to the receiver 214 as pulses 226. In addition, a portion of the signal containing the pulses 220 can be reflected from the interface 112, reflected off the top surface 114, and reflected again off the interface 112, returning to the receiver 214 as pulses 228 (representing a "second-order" type of reflection). While not shown, additional portions of the signal could reflect in additional ways.

In the example shown in FIG. 2, the sensor 120 or the MCU 124 could combine various models associated with different types of reflections in various ways, fit the combined models onto the received signals, and determine which of the combined models most closely approximates the actual reflected signals received by the sensor 120. For example, one set of models could represent the pulses 222 that are reflected when the top surface 114 of the material 104 is at different heights within the tank 102. Another set of models could represent the pulses 224 that are reflected when the interface 112 of the layers 110a-110b is at different heights within the tank 102. Yet another set of models could represent the pulses 228 that are reflected from the interface 112, then the top surface 114, and then the interface 112 again when the layers 110a-110b have different relative heights.

By fitting different models from the various sets onto the actual reflected signals received by the sensor 120, the sensor 120 or MCU 124 can compare the models to the actual received signals and select the best combination of models. That combination of models can then be used during signal processing to identify specific reflections received by the sensor 120, and those specific reflections can be used in the time-of-flight or other calculations.

The following discussion relates to particular implementations of the sensor 120. The details below are specific to the particular implementations of the sensor 120 and do not necessarily limit this disclosure to any specific embodiment of the sensor 120.

As shown in FIG. 3, pulses can be reflected from and transmitted through various surfaces of material 104 in a tank 102. For example, some portion of the pulses from the transmitter 212 reflects from the top surface 114, which has a reflectance of $r_{12}$, toward the receiver 214. Also, some portion of the pulses from the transmitter 212 transmits through the top surface 114, which has a transmittance of $t_{12}$, towards the interface 112. Some portion of the pulses transmitted through the top surface 114 reflects from the interface 112, which has a reflectance of $r_{23}$. Of those pulses, some portion of the pulses reflected from the interface 112 transmit through the top surface 114, which has a transmittance of $t_{21}$, toward the receiver 214. Another portion of the pulses reflected from the interface 112 reflect again from the top surface 114, which has a reflectance of $r_{21}$, back towards the interface 112, and those pulses could then reflect from the interface 112 back towards the top surface 114 and towards the receiver 214.

Various model equations can be used to describe the pulses that are transmitted by the transmitter 212 toward the top surface 114 and interface 112 of material 104 in a tank 102. Two example types of model equations that could be used are damped sine and damped cosine functions. The exact model equation to be used by a sensor 120 can depend on a number of factors, such as the shape of pulses 220 generated by the sensor 120 and the specific components forming the sensor 120. Such model equations can be easily generated by one skilled in the relevant art.

The model equation representing the pulses 220 generated by a sensor 120 can then be used to model reflections from the top surface 114 and interface 112 of material 104 in a tank 102. As a generic example, a function $f(x)$ for modeling reflections from the top surface 114 and interface 112 could be expressed as:

$$f(x) = g \times h(x, w_1, w_2, \ldots) \quad (1)$$

Here, h denotes a model equation of the pulses, $w_1$ and $w_2$ denote model parameters of h, and g denotes the model gain.

In various cases (including those where the top surface 114 and the interface 112 are so close that individual reflections cannot be identified), multiple superimposed models s(x) can be fit onto the received reflections. In some embodiments, each superimposed model s(x) could be constructed from the superposition of a surface, interface, and second-order model as follows:

$$s(x) = g_1 \times h_1(x-t, w_1, \ldots) + g_2 \times h_2(x, w_2, \ldots) + g_3 \times h_3(x+t, w_3, \ldots) \quad (2)$$

In Equation (2), $h_1$, $h_2$, and $h_3$ are model equations defining the shapes of top surface, interface, and second-order reflections, respectively. Also, $w_1$, $w_2$, and $w_3$ are parameters for the h functions. Further, $g_1$, $g_2$, and $g_3$ are model gains for the top surface, interface, and second-order reflections, respectively. In addition, t denotes the thickness of the upper layer 110b of material 104 in the tank 102. Note that the model functions $h_1$, $h_2$, and $h_3$ and/or the parameters $w_1$, $w_2$, and $w_3$ may or may not be identical for the top surface, interface, and second-order reflections.

It is possible to calculate the gains $g_1$, $g_2$, and $g_3$ for a specific instance of material 104 in a tank 102. Various techniques can be used to calculate the gains $g_1$, $g_2$, and $g_3$ here. One example technique is provided below, although any other suitable techniques could be used to identify the gains $g_1$, $g_2$, and $g_3$.

In one example technique, the gains can be calculated using Fresnel equations and the dielectric constants of the materials in the tank 102. Assume $DC_v$, $DC_{up}$, and $DC_{lw}$ denote the dielectric constant of the vapor above the top surface 114, the dielectric constant of the upper layer 110b, and the dielectric constant of the lower layer 110a, respectively. These dielectric constants can be determined in any suitable manner, such as via direct measurement or by inference from other measurements. Given that, the gains can be expressed as follows:

$$g_1 = A_1 r_{12} = A_1 \frac{\sqrt{DC_v} - \sqrt{DC_{up}}}{\sqrt{DC_v} + \sqrt{DC_{up}}} \quad (3)$$

$$g_2 = A_1 t_{12} r_{23} t_{21} = A_2 \frac{4\sqrt{DC_v DC_{up}}}{\left(\sqrt{DC_v} + \sqrt{DC_{up}}\right)^2} \frac{\sqrt{DC_{up}} - \sqrt{DC_{lw}}}{\sqrt{DC_{up}} + \sqrt{DC_{lw}}} \quad (4)$$

$$g_3 = A_3 t_{12} r_{23} r_{21} r_{23} t_{21} \quad (5)$$

Here, the factors $A_1$, $A_2$, and $A_3$ represent amplitudes of an incident pulse $A_0$, which are lowered through attenuation by the top surface, interface, and second-order reflections, respectively. These factors could be expressed as:

$$A_1 = A_0 e^{-\alpha_v x} \quad (6)$$

$$A_2 = A_0 e^{-\alpha_v x} e^{-\alpha_{up} t} \quad (7)$$

$$A_3 = A_0 e^{-\alpha_v x} e^{-2\alpha_{up} t} \quad (8)$$

Here, x is the position of the top surface 114 and t is the thickness of the upper layer 110b. Also, $a_v$ is the attenuation caused by the vapor above the top surface 114, and $\alpha_{up}$ is the attenuation caused by the upper layer 110b. Using algebra and the conservation relation $(t_{12} t_{21} + r_{12}^2) = 1$, the gain $g_3$ can be calculated in terms of $g_1$, $g_2$ and $A_1$ as follows:

$$g_3 = \frac{-g_1 g_2^2}{A_1^2 - g_1^2} \quad (9)$$

Once the gain values $g_1$, $g_2$, and $g_3$ are identified (in whatever manner), these values can be used in Equation (2) above. Different function(s) $h_1$, $h_2$, and $h_3$, parameters $w_1$, $w_2$, and $w_3$, and thicknesses t can be used to generate different superimposed models s(x). As noted above, the $h_1$, $h_2$, and $h_3$ functions may or may not be identical, and the parameters $w_1$, $w_2$, and $w_3$ may or may not be identical. The superimposed model s(x) that most closely fits onto the actual signals received by the sensor 120 could then be selected. The selected model can be used to estimate the reflections from the top surface 114 and the interface 112 in the received signals, and those estimated reflections can be used in the time-of-flight or other calculations.

FIG. 4 illustrates an example matching of superimposed models onto actual reflected signals received at a sensor. In FIG. 4, a line 402 denotes a signal containing actual reflections received by the sensor 120. A line 404 denotes the same signal 402 after subtracting for background. The background denotes echoes received when the tank 102 is empty or when the material level is below some minimum value. In this example, the line 402 identifies a reference pulse 406, which denotes a pulse sent directly to the receiver 214 without passing through the waveguide 126 or being transmitted into the tank 102. For instance, the reference pulse 406 could be sent from the transmitter 212 or pulse generator 210 to the receiver 214 via a circuit path or path through an ASIC or other device in which the components 210-214 are fabricated. The location of the reference pulse 406 can be determined and used, such as to identify a time-of-flight between the reference pulse 406 and one or more reflections. The line 402 also identifies a process connector reflection 408, which denotes a pulse that is reflected from a process connector (which couples the sensor 120 to the tank 102). Note, however, that a process connector reflection 408 may not be present.

The line 402 further identifies additional reflections (denoted generally as reflections 410) following the process connector reflection 408. The reflections 410 include pulses reflected from the top surface 114 and interface 112 of the material 104, as well as from the end of the waveguide 126 or structures of the tank 102 itself. One function of the sensor 120 is to identify which reflections 410 correspond to pulses reflected from the top surface 114 and interface 112 of the material 104. This can be difficult when a layer of material 104 is thin, which can cause reflected pulses to overlap.

FIG. 4 also shows how two models can be fit to the lines 402 and 404. A line 412 here denotes a model that represents the reference signal forming the reference pulse 406. The reference signal denotes the pulse sent from the transmitter 212 to the receiver 214 without modification. A line 414 here denotes a superimposed model s(x) that represents top surface, interface, and second-order reflections from the material 104 in the tank 102. This model defines how various pulses in the received signals can interact, so this model can be used to identify where the actual reflections are for the top surface 114 and the interface 112 in the received signals. Those reflection locations could then be used in time-of-flight, TDR, or other calculations.

Although FIGS. 2 through 4 illustrate one example of a sensor 120 for measuring thin material thicknesses in inventory management applications, various changes may be made to FIGS. 2 through 4. For example, the functional division shown in FIG. 2 is for illustration only. Various components in FIG. 2 could be combined, further subdivided, rearranged, or omitted or additional components could be added according to particular needs. Also, while various functions may be attributed to specific components in the sensor 120, other sensors could implement those functions in different ways. For instance, the sensor 120 could pass data defining the received signals to the MCU 124 for analysis. In addition, the signals shown in FIGS. 3 and 4 are for illustration only.

Figure 5:
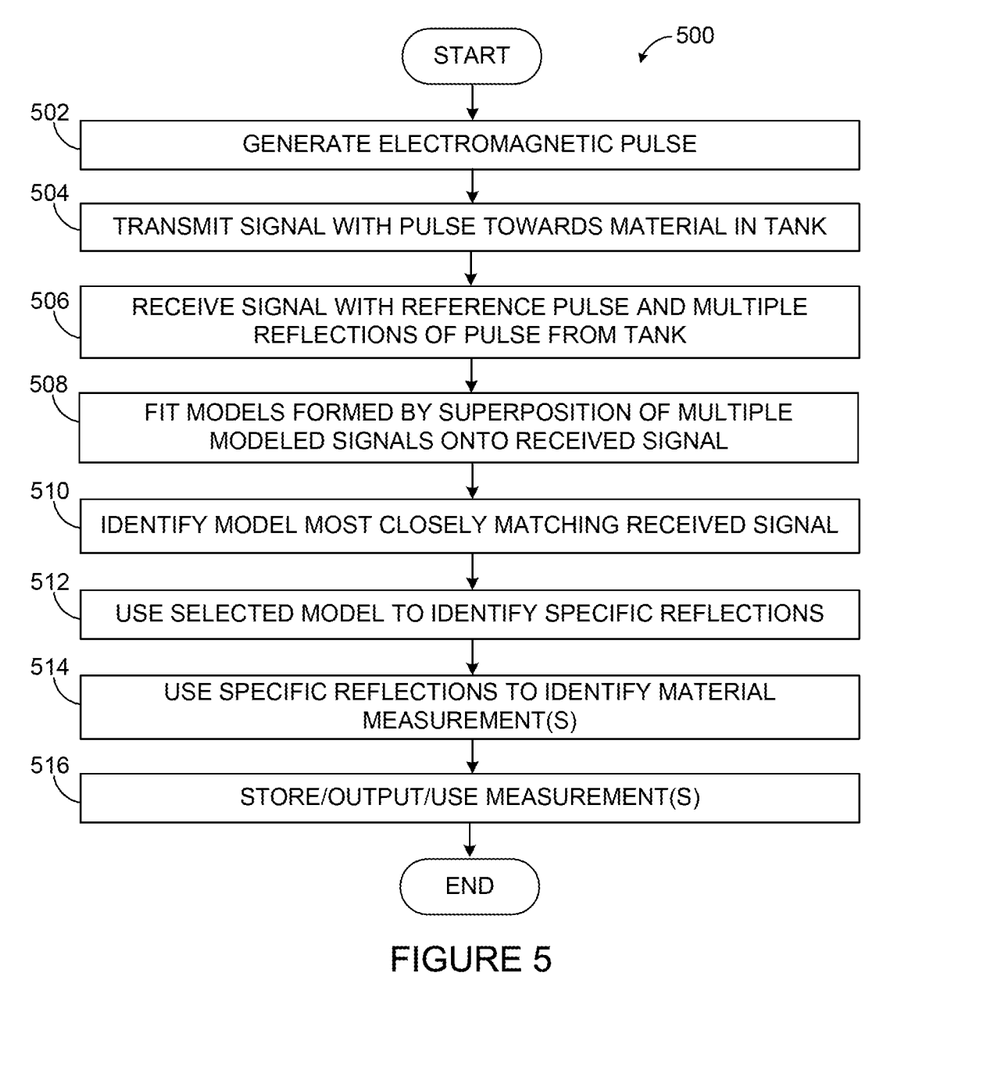
FIG. 5 illustrates an example method for measuring thin material thicknesses in inventory management applications according to this disclosure.

FIG. 5 illustrates an example method 500 for measuring thin material thicknesses in inventory management applications according to this disclosure. For ease of explanation, the method 500 is described as being used by the sensor 120 of FIG. 2 in the system 100 of FIG. 1. However, the method 500 could be used with any other suitable sensor and any other suitable system.

As shown in FIG. 5, at least one electromagnetic pulse is generated at step 502 and transmitted in a signal towards material in a tank at step 504. This could include, for example, the pulse generator 210 of the sensor 120 generating an electromagnetic pulse and the transmitter 212 transmitting a signal containing the pulse 220. Any number of pulses with any suitable duration(s) and pattern(s) could be generated and transmitted here. A signal containing a reference pulse and multiple reflections of the transmitted pulse is received at step 506. This could include, for example, the receiver 214 of the sensor 120 receiving the reference pulse 406 directly from the pulse generator 210 or the transmitter 212. This could also include the receiver 214 receiving pulses 222-228 as reflections 410.

Different models are fit onto the received signal at step 508, and the model most closely matching the received reflections is identified at step 510. This could include, for example, the processing device 216 of the sensor 120 fitting various superimposed models s(x), such as those generated in accordance with Equation (2) above, onto the received signal. The model gains $g_1$, $g_2$, and $g_3$ could be determined as described above or in any other suitable manner. The $h_1$, $h_2$, and $h_3$ model equations could be based on the shape of the electromagnetic pulse that was generated. The $w_1$ and $w_2$ parameters could have been determined previously, such as when the top surface 114 and interface 112 were separated by an adequate distance (a large thickness). The $w_3$ parameter(s) for the second-order reflection could be the same as for the top surface 114 or interface 112. The thickness t could be varied to generate different superimposed models s(x). Note that some logic could be used to reduce the number of superimposed models fit onto the received signal, such as by limiting the superimposed models to those that are most likely to be correct in view of prior measurements captured by the sensor 120.

The model most closely matching the received signal is identified at step 510. This could include, for example, the processing device 216 determining which superimposed model s(x) most closely matches the peaks and valleys of the received signal. Any suitable measure could be used to select the best superimposed model, such as by selecting the superimposed model having the least squares error when compared to the received signal.

The selected model is used to identify one or more specific reflections in the received signal at step 512, and the one or more specific reflections are used to identify at least one material measurement at step 514. This could include, for example, the processing device 216 using the selected model to identify the locations of reflections from the top surface 114 and an interface 112 of the material 104 in the tank 102. Since the selected model can identify how pulses reflected from the top surface 114 and interface 112 interact when the upper layer 110b is thin, the selected model helps the processing device 216 to more accurately identify the locations of the reflections. Once the locations of the reflections are known, the processing device 216 can perform time-of-flight, TDR, or other calculations. The material measurement(s) generated here could include any suitable measurement(s), such as a level of material 104 in the tank 102 (like a location or height of the top surface 114), a position of the interface 112 in the tank 102 (like a location or height of the interface 112), or one or more thicknesses of one or more layers 110a-110b of material 104 in the tank 102.

The one or more material measurements could be stored, output, or used in any suitable manner at step 516. This could include, for example, the processing device 216 outputting the one or more measurements on the user interface 208. This could also include the processing device 216 transmitting the one or more measurements to the MCU 124 or other external destination.

Although FIG. 5 illustrates one example of a method 500 for measuring thin material thicknesses in inventory management applications, various changes may be made to FIG. 5. For example, while shown as a series of steps, various steps in FIG. 5 could overlap, occur in parallel, occur in a different order, or occur any number of times. In particular, the method 500 could be repeated any number of times in quick succession to identify multiple measurements, which could be averaged or otherwise processed to generate one or more final measurements. As another example, steps 508-512 could be skipped in situations when the sensor 120 is able to identify reflections from the top surface 114 and the interface 112, such as when the upper layer 110b of material 104 in the tank 102 is large enough so that the appropriate reflections can be identified.

Note that the above-described approach for fitting models to help locate pulse reflections can be used in various level calculation algorithms or other algorithms to help improve the algorithms' reflection-finding abilities. For example, among other things, U.S. Patent Publication No. 2016/

0097669 (which is hereby incorporated by reference in its entirety) describes a level finding algorithm having a coarse search and a fine search. The coarse search minimizes a prediction error between an actual echo signal y(k) and a pulse model echo p(k) to obtain an objective function J(k) in a vicinity of a minimum prediction error k*. The fine search calculates at least one minimum or maximum using J(k) in the vicinity of k*, where the minimum or maximum corresponds to a level of material or an interface involving the material. This level finding algorithm could use the above-described approach for fitting models during the coarse search in order to identify the pulse model echo p(k) that is used to calculate the prediction error. Additional details regarding this technique are provided in the U.S. patent publication incorporated by reference above.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a sensor that captures measurements associated with a material in a tank, the sensor including a transmitter and a receiver, wherein the transmitter is configured to transmit a signal comprising an electromagnetic pulse towards the material in the tank and the receiver is configured to receive a signal comprising multiple reflections of the pulse; and
   at least one processing device configured to determine a measurement associated with the material in the tank based on the received signal;
   wherein, to determine the measurement, the at least one processing device is configured to:
   fit multiple models onto the received signal, each model constructed from a superposition of multiple types of pulse reflections;
   select one of the models;
   identify at least one of the multiple reflections in the received signal using the selected model; and
   determine the measurement using the at least one identified reflection in the received signal,
   wherein the multiple reflections in the received signal include a reflection of the pulse from a top surface of the material in the tank and a reflection of the pulse from an interface between different layers of material in the tank, and the at least one processing device is configured to use the selected model to identify the reflection from the top surface of the material and the reflection from the interface in the received signal, and
   wherein each model is constructed using:
   a modeled surface reflection representing a modeled pulse reflection from the top surface of the material; and
   a modeled interface reflection representing a modeled pulse reflection from the interface between the different layers of material; and
   wherein each model is further constructed using: a modeled second-order reflection representing a modeled pulse reflection from the interface, then from the top surface, and then from the interface again.

2. The apparatus of claim 1, wherein the electromagnetic pulse comprises a radar pulse.

3. The apparatus of claim 2, wherein the at least one processing device is configured to fit the models onto the received signal, select one of the models, and use the selected model when an upper layer of material in the tank has a thickness below a threshold value such that the reflection from the top surface of the material and the reflection from the interface in the received signal overlap.

4. The apparatus of claim 3, wherein the threshold value is 20 centimeters or less.

5. The apparatus of claim 1, wherein the electromagnetic pulse comprises an ultrasonic pulse.

6. The apparatus of claim 1, wherein the at least one processing devices comprises at least one of the following: a microprocessor, a microcontroller, a digital signal processor, a field programmable gate array, an application specific integrated circuit, and a discrete logic device.

7. The apparatus of claim 1, further comprising:
a waveguide configured to transport the signal comprising the electromagnetic pulse from the transmitter and to transport the signal comprising the multiple reflections to the receiver.

8. The apparatus of claim 1, wherein:
the received signal comprises a reference pulse representing the electromagnetic pulse and not being transmitted towards the material in the tank; and
the at least one processing device is configured to use a location of the reference pulse to determine the measurement.

9. The apparatus of claim 1, wherein the measurement comprises at least one of:
a location or height of a top surface of the material in the tank;
a location or height of an interface between different layers of material in the tank; and
at least one thickness of at least one of the different layers of material in the tank.

10. A method comprising:
transmitting from a sensor, a signal comprising an electromagnetic pulse towards material in a tank, the sensor configured to capture measurements associated with the material in the tank, the sensor including a transmitter and a receiver, wherein the transmitted transmits the signal comprising the electromagnetic pulse toward the material in the tank, and the receiver is configured to receive a signal comprising multiple reflections of the pulse;
receiving via the receiver, the signal comprising the multiple reflections of the pulse; and
determining a measurement associated with the material in the tank using the received signal via at least one processing device configured to determing the measurement associated with the material in the tank based on the received signal, wherein determining the measurement comprises:
fitting multiple models onto the received signal, each model constructed from a superposition of multiple types of pulse reflections;
selecting one of the models;
identifying at least one of the multiple reflections in the received signal using the selected model; and
determining the measurement using the at least one identified reflection in the received signal,
wherein:
the multiple reflections in the received signal include a reflection of the pulse from a top surface of the material in the tank and a reflection of the pulse from an interface between different layers of material in the tank;
the selected model is used to identify the reflection from the top surface of the material and the reflection from the interface in the received signal; and
wherein:
the models are fit onto the received signal, one of the models is selected, and the selected model is used when an upper layer of material in the tank has a thickness below a threshold value such that the reflection from the top surface of the material and the reflection from the interface in the received signal overlap.

11. The method of claim 10, wherein the at least one processing devices comprises at least one of the following: a microprocessor, a microcontroller, a digital signal processor, a field programmable gate array, an application specific integrated circuit, and a discrete logic device.

12. The method of claim 11, wherein the electromagnetic pulse comprises at least one of: a radar pulse and an ultrasonic pulse.

13. The method of claim 10, wherein each model is constructed using:
a modeled surface reflection representing a modeled pulse reflection from the top surface of the material; and
a modeled interface reflection representing a modeled pulse reflection from the interface between the different layers of material.

14. The method of claim 13, wherein each model is further constructed using:
a modeled second-order reflection representing a modeled pulse reflection from the interface, then from the top surface, and then from the interface again.

15. The method of claim 10, wherein:
the received signal comprises a reference pulse representing the electromagnetic pulse and not being transmitted towards the material in the tank; and
the method further comprises using a location of the reference pulse to determine the measurement.

16. A non-transitory computer readable medium containing instructions that, when executed by at least one processing device, cause the at least one processing device to:
obtain from a sensor, information associated with a received signal comprising multiple reflections of an electromagnetic pulse that is transmitted towards material in a tank, wherein the sensor captures measurements associated with the material in the tank, the sensor including a transmitter and a receiver, where the transmitter transmits a signal comprising the electromagnetic material in the tank and the receiver is configured to receive the signal as the received signal comprising the multiple reflections of the electromagnetic pulse; and
determine a measurement associated with the material in the tank using the information associated with the received signal;
wherein the instructions that when executed cause the at least one processing device to determine the measurement comprise instructions that when executed cause the at least one processing device to:
fit multiple models onto the received signal, each model constructed from a superposition of multiple types of pulse reflections;
select one of the models;
identify at least one of the multiple reflections in the received signal using the selected model; and
determine the measurement using the at least one identified reflection in the received signal, wherein each model is further constructed using a modeled second-order reflection representing a modeled pulse reflection from the interface, then from the top surface, and then from the interface again.

17. The non-transitory computer readable medium of claim 16, wherein:
the multiple reflections in the received signal include a reflection of the pulse from a top surface of the material in the tank and a reflection of the pulse from an interface between different layers of material in the tank; and the selected model is used to identify the reflection from the top surface of the material and the reflection from the interface in the received signal.

18. The non-transitory computer readable medium of claim 17, wherein each model is constructed using:

a modeled surface reflection representing a modeled pulse reflection from the top surface of the material; an a modeled interface reflection representing a modeled pulse reflection from the interface between the different layers of material.

19. The non-transitory computer readable medium of claim 18, wherein the electromagnetic pulse comprises at least one of: a radar pulse and an ultrasonic pulse.

20. The non-transitory computer readable medium of claim 16, wherein:

the received signal comprises a reference pulse representing the electromagnetic pulse and not being transmitted towards the material in the tank; and the non-transitory computer readable medium further contains instructions that when executed cause the at least one processing device to use a location of the reference pulse to determine the measurement.

* * * * *